(12) United States Patent
Richardson et al.

(10) Patent No.: US 7,402,357 B2
(45) Date of Patent: Jul. 22, 2008

(54) GAS-FILLED GASKET FOR A SOLID-OXIDE FUEL CELL ASSEMBLY

(75) Inventors: Curtis A. Richardson, Voorheesville, NY (US); Karl J. Haltiner, Jr., Fairport, NY (US)

(73) Assignee: Delphi Technologies, Inc, Troy, MI (US)

( * ) Notice: Subject to any disclaimer, the term of this patent is extended or adjusted under 35 U.S.C. 154(b) by 945 days.

(21) Appl. No.: 10/607,603

(22) Filed: Jun. 27, 2003

(65) Prior Publication Data

US 2004/0265673 A1  Dec. 30, 2004

(51) Int. Cl.
 *H01M 2/08* (2006.01)
(52) U.S. Cl. ............................. 429/34; 429/35; 429/36
(58) Field of Classification Search ............... 429/34, 429/35, 36, 37, 12; 277/650, 628, 654, 637; 180/65.3
See application file for complete search history.

(56) References Cited

U.S. PATENT DOCUMENTS 6,231,053 B1 * 5/2001 Wakamatsu ................. 277/628
6,720,103 B1 * 4/2004 Nagai ........................... 429/36
2003/0150162 A1 * 8/2003 Inagaki et al. ................. 48/195
2004/0053099 A1 * 3/2004 Franklin et al. ............... 429/30

FOREIGN PATENT DOCUMENTS

JP 06-96783 * 4/1994
WO WO 01/17048 * 8/2001

* cited by examiner

*Primary Examiner*—Raymond Alejandro
(74) *Attorney, Agent, or Firm*—Paul L. Marshall

(57) ABSTRACT

In a solid-oxide fuel cell assembly, a sealing gasket is disposed between spaced, parallel components and includes a gas-filled pillow structure formed in the general shape of the manifold opening to be sealed. The gasket acts as a passive gas spring that responds with increased seating force to increased temperature. The gasket comprises first and second elements formed from sheet or foil metal stock having mating concavities and joined along their mutual surfaces to form the gas-filled pillow structure in the shape of each opening to be sealed. The first and second elements are respectively formed of the same material as the components and diffusion bonded on their outer surfaces to their respective component surfaces.

3 Claims, 3 Drawing Sheets

US 7,402,357 B2

GAS-FILLED GASKET FOR A SOLID-OXIDE FUEL CELL ASSEMBLY

TECHNICAL FIELD

The present invention relates to gaskets for fuel cell assemblies; more particularly, to means for sealing major components to an integrated component manifold (ICM) during manufacture of fuel cell assemblies; and most particularly, to a compliant metal gasket for such purpose comprising an impermeable gas-filled pillow structure.

BACKGROUND OF THE INVENTION

Fuel cells that generate electric current by controllably combining elemental hydrogen and oxygen are well known. In one form of such a fuel cell, an anodic layer and a cathodic layer are separated by a permeable electrolyte formed of a ceramic solid oxide. Such a fuel cell is known in the art as a "solid-oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ ions catalytically by the cathode. The oxygen ions diffuse through the electrolyte and combine at the anode/electrolyte interface with four hydrogen ions to form two molecules of water. The anode and the cathode are connected externally through the load to complete the circuit whereby four electrons are transferred from the anode to the cathode. When hydrogen is derived from "reformed" hydrocarbons, the "reformate" gas includes CO which is also a fuel for the fuel cell and is converted to $CO_2$ at the anode. Reformed gasoline is a commonly used fuel in automotive fuel cell applications.

Because a single cell is capable of generating a relatively small voltage and wattage, in practice it is usual to stack together, in electrical series, a plurality of such cells. Adjacent cells are connected electrically by interconnect elements in the "stack." The outermost, or end, interconnects of the stack define electric terminals, or "current collectors," which may be connected across a load.

A complete SOFC assembly typically includes auxiliary subsystems for, among other requirements, generating fuel by reforming hydrocarbons via a reformer; tempering via heat exchangers the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack. Such auxiliary subsystems may be mechanically integrated into an SOFC assembly or system by individual attachment to an Integrated Component Manifold (ICM) whereby all flows of gases are appropriately directed throughout the assembly.

In the prior art, a problem exists in providing a durable hermetic seal in the joint between each of the components and the ICM. In an SOFC being supplied with fuel from a reformer, for example, the fuel cell supply gas is provided directly from the reformer at an elevated temperature (800° C.-1000° C.). In the prior art, gasketing for gas seals at such temperatures requires special materials such as glass, silver foil, and/or mica. Such seals are difficult and expensive to fabricate and are prone to failure upon repeated thermal cycling, resulting in failure of the fuel cell assembly. Further, prior art mechanical seals typically exert relatively light compressive sealing loads, require high degree of flatness of the surfaces to be sealed, and tend to relax or lose resilience with time and use.

It is a principal object of the present invention to provide a permanently resilient and compliant gasket that maintains a high positive sealing pressure under all fuel cell use conditions, that is relatively easy to fabricate and install into a fuel cell assembly, and that can diffusion bond to the surfaces to be sealed.

BRIEF DESCRIPTION OF THE INVENTION

Briefly described, in a solid-oxide fuel cell assembly, a sealing gasket between each individual component or sub-assembly and an integrating component manifold comprises a gas-filled linear pillow structure formed in the general shape of the manifold opening to be sealed, resembling a gas-filled "O-ring." The gasket is formed of a gas-impermeable material, preferably metal, such that the gas fill is maintained hermetically for the working life of the gasket. The gasket acts as a passive gas spring that responds to increased temperature with increased seating force.

In a currently preferred embodiment, the gasket comprises first and second elements formed from sheet metal stock to have linear mating concavities supported by planar surrounds. The elements are joined along their mutual planar surfaces as by friction welding or other technique to provide linear gas-filled gasketing pillows formed generally in the shape of the opening to be sealed and supported by non-gasketing planar regions. Preferably, the first and second elements are each formed of the same material as the surface to be sealed, allowing the elements to become diffusion bonded on their outer surfaces to their respective fuel cell component surfaces.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
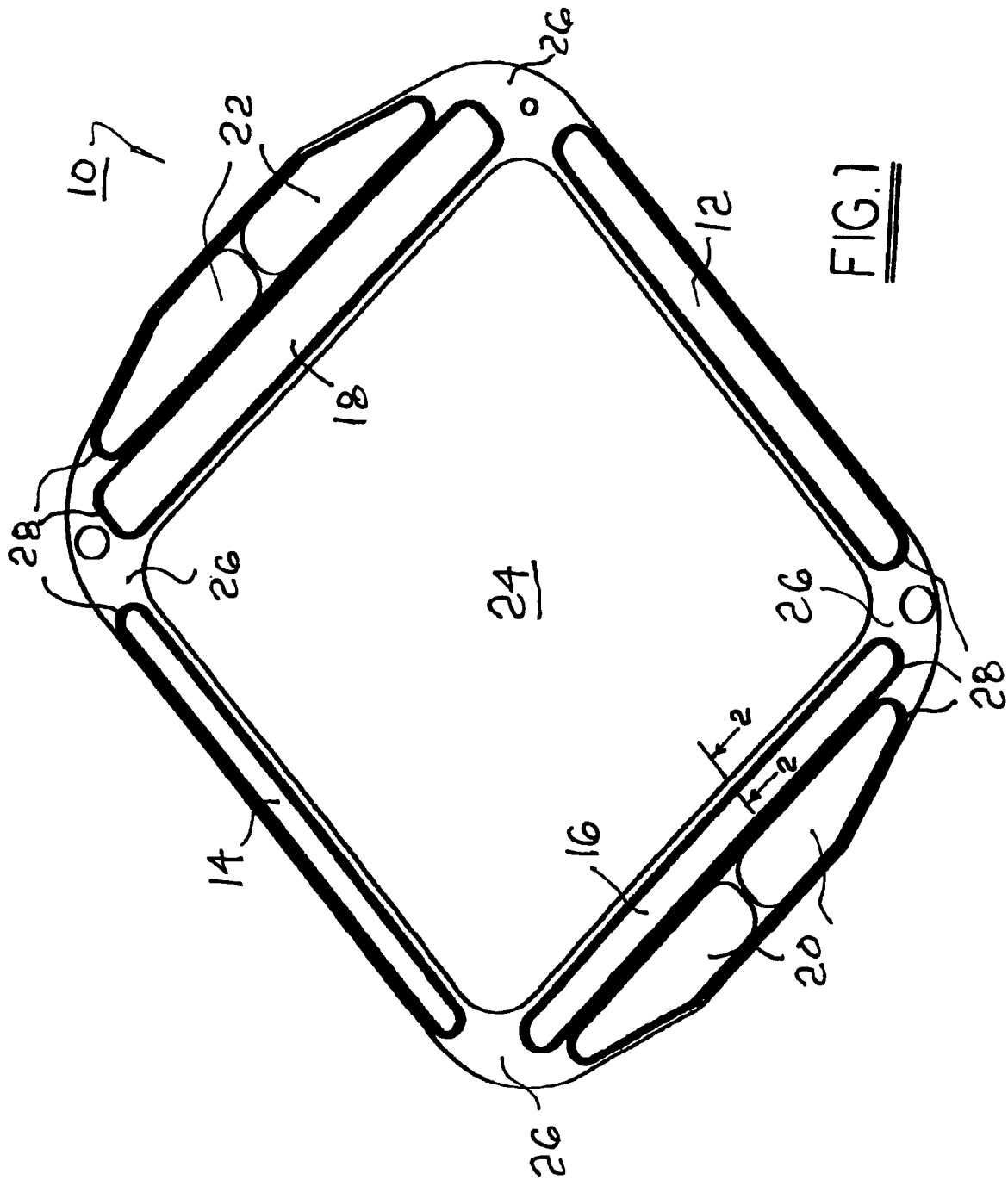
FIG. 1 is an isometric view of a gas-filled gasket in accordance with the invention, showing in particular a gasket for sealing a fuel cell stack to an integrated component manifold.
Figure 4:
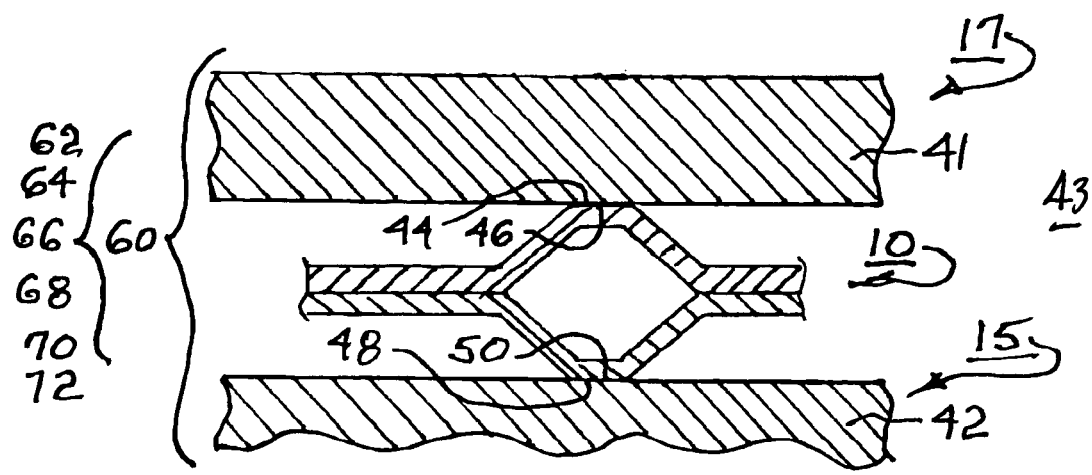
FIG. 4 is a cross-sectional view showing the gasket shown in FIG. 1 installed for sealing a joint between a fuel cell stack and an integrated component manifold in a fuel cell assembly.

Referring to FIG. 1, a gas-filled gasket 10 in accordance with the invention is formed generally in the shape of surfaces and openings to be gasketed. Gasket 10 has first openings 12,14 for passage of gaseous fuel such as reformate between an integrated component manifold 15 and a fuel cell stack 17 (FIG. 4); second openings 16,18 for similar but orthogonal passage of gaseous oxidant such as air; third openings 20,22 for passage of cooling air; and a non-functional fourth opening 24 for conservation of material and reduction in weight. Gasket 10 comprises planar regions 26, and non-planar regions 27 defining pillow structures 28 surrounding the respective first, second, and third openings. Each structure 28 is a closed loop surrounding a respective opening.

Figure 2:
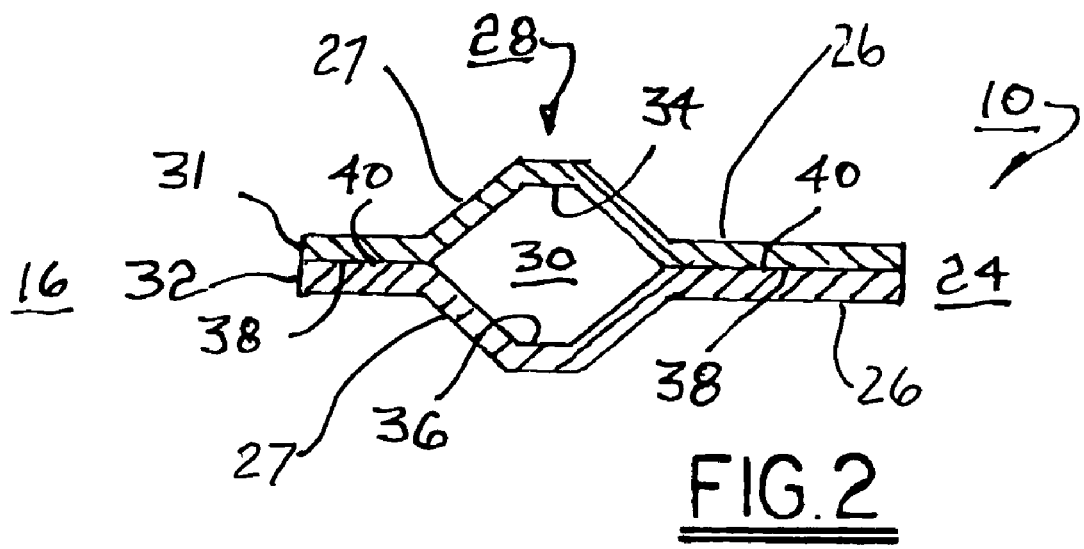
FIG. 2 is a cross-sectional view of a first embodiment of a gasket in accordance with the invention, taken at line 2-2 in FIG. 1.
Figure 3:
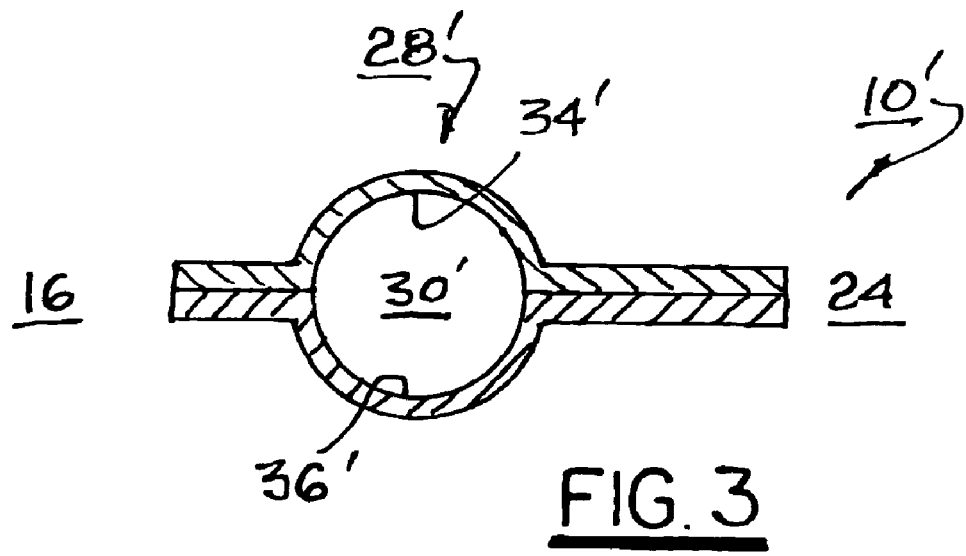
FIG. 3 is a cross-sectional view of a second embodiment of a gasket in accordance with the invention, alternatively taken at line 2-2 in FIG. 1.

Referring to FIGS. 2 and 3, pillow structure 28 (or 28') is a non-planar element of gasket 10 (or 10') enclosing a chamber 30 (or 30') filled with a gas such as air. Various methods for forming such a combined planar and non-planar gasket, as may suggest themselves to persons skilled in the art, fall within the scope of the invention. In a currently preferred method for forming gasket 10, first and second elements 31,32, respectively, are formed from appropriate sheet or foil metal stock to have linear mating concavities 34,36 (34',36'). Elements 31,32 then are joined along their mutual contacting surfaces 38,40 as by friction welding, brazing, or other technique to form planar regions 26 and pillow 28 (28') and to create chamber 30 (30') filled with gas.

In simplest and currently preferred form, chamber 30 (30') is filled with air at atmospheric pressure at ambient temperature. Structure 28 (28') and chamber 30 (30') thus define a gas spring that guarantees compliance and rebound of gasket 10 at any temperature and pressure. For example, at 800° C. an axial sealing force of 200 psf can be developed at a gas pressure of 51 psig. Because the gasket is installed under a predetermined initial axial load, the captive gas pillow ensures that a positive sealing pressure always exists under both use and shutdown conditions of a fuel cell assembly.

Preferably, first and second elements 31,32 are respectively formed of the same material as the component surface to be sealed, allowing the elements to become diffusion bonded at the interfaces between their outer surfaces and their respective fuel cell component surfaces. For example, referring to FIG. 4, a mounting plate 41 for fuel cell stack 17 of fuel cell assembly 43 may be formed from 430 stainless steel, and a corresponding top plate 42 for an integrated component manifold 15 may be formed from Haynes 230. Corresponding first and second gasket elements 31,32 are preferably formed of the same materials, allowing diffusion bonding or galling to occur along stack mating surfaces 44,46 and ICM mating surfaces 48,50. This bonding creates a hermetic seal between the gasket and the component surfaces under elevated temperature and loading during assembly and use of a fuel cell system, further enhancing the sealing capability of gasket 10.

Referring again to FIGS. 2 and 3, pillow structure 28,28' may assume any cross-sectional shape as may occur to one skilled in the art, for any chosen application. FIG. 2 shows a generally diamond shape; FIG. 3 a circular shape. Other shapes, not shown, also fall within the scope of the invention.

A gas-filled gasket in accordance with the invention is especially useful as a component of a fuel cell auxiliary power unit 60 (APU) for vehicles on which the APU may be mounted. Such vehicles may include cars 62 and trucks 64, boats 66 and ships 68, airplanes 70, and space vehicles 72 wherein motive power is supplied by a separate motive engine and the auxiliary electrical power needs are met by APU 60.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell assembly comprising,
   first and second components in spaced, parallel relationship, and
   a gasket disposed between said first and second components, said gasket being formed of first and second sheet metal elements and including
   a planar region having an opening therein for passage of gas between said first and second components, said first and second sheet metal elements being bonded at said planar region, and
   a pillow structure surrounding said opening and extending from said planar region, said pillow structure defining a gas-filled chamber enclosed with said first and second sheet metal elements and being diffusion bonded to said first and second components to form a sealed joint therebetween.

2. A fuel cell assembly in accordance with claim 1 wherein said assembly is an auxiliary power unit for a vehicle.

3. A fuel cell assembly in accordance with claim 2 wherein said vehicle is selected from the group consisting of car, truck, boat, ship, airplane, and space vehicle.

* * * * *